United States Patent
Kim et al.

(10) Patent No.: US 9,590,407 B2
(45) Date of Patent: Mar. 7, 2017

(54) DEVICE FOR REMOVING ICE AND SNOW FROM POWER TRANSMISSION LINE

(71) Applicant: Korea Electric Power Corporation, Seoul (KR)

(72) Inventors: Young Ki Kim, Gangneung-si (KR); Seung Hoon Lee, Gangneung-si (KR); Sang Hee Choi, Gangneung-si (KR); Bum Young Kang, Gangneung-si (KR); Hyun Jong Jung, Gangneung-si (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 111 days.

(21) Appl. No.: 14/286,309

(22) Filed: May 23, 2014

(65) Prior Publication Data
US 2015/0059114 A1 Mar. 5, 2015

(30) Foreign Application Priority Data
Sep. 5, 2013 (KR) .................. 10-2013-0106855

(51) Int. Cl.
*H02G 7/16* (2006.01)

(52) U.S. Cl.
CPC .................. *H02G 7/16* (2013.01)

(58) Field of Classification Search
CPC ........................................ H02G 7/16
USPC ................ 174/40 R, 40 TD; 244/134 R
See application file for complete search history.

(56) References Cited

U.S. PATENT DOCUMENTS

| | | | |
|---|---|---|---|
| 6,518,497 B1* | 2/2003 | Allaire | H02G 7/16 174/40 R |
| 6,660,934 B1 | 12/2003 | Nourai et al. | |
| 7,951,098 B2* | 5/2011 | Wu | A61H 1/005 601/49 |
| 8,806,692 B2* | 8/2014 | Zhang | H02G 7/16 15/93.1 |
| 2004/0065458 A1* | 4/2004 | Hansen | H02G 7/16 174/40 R |
| 2004/0159453 A1* | 8/2004 | Shirmohamadi | H02G 7/16 174/40 R |
| 2006/0138885 A1* | 6/2006 | Uchiumi | H02K 5/00 310/81 |

(Continued)

FOREIGN PATENT DOCUMENTS

| CN | 202059132 U | 11/2011 |
|---|---|---|
| JP | 61189111 A | 2/1985 |

(Continued)

OTHER PUBLICATIONS

Russian Office Action issued in Application No. 2014120995 dated Jul. 3, 2015.

(Continued)

*Primary Examiner* — Dimary Lopez Cruz
(74) *Attorney, Agent, or Firm* — McDermott Will & Emery LLP

(57) ABSTRACT

A device for removing ice and snow from a power transmission line includes a support member installed on the power transmission line, and a vibrator that is provided for the support member and applies vibrations to the power transmission line so as to remove the ice and the snow attached to the power transmission line.

7 Claims, 6 Drawing Sheets

(56) References Cited

U.S. PATENT DOCUMENTS

2007/0278349 A1* 12/2007 Bembridge .............. H02G 7/16
                                                       244/134 R

FOREIGN PATENT DOCUMENTS

| KR | 20-0259346 Y1    | 12/2001 |
|----|------------------|---------|
| KR | 10-2004-0044805 A | 5/2004  |
| KR | 20-2011-0001300 U | 2/2011  |
| KR | 10-2013-0058484 A | 6/2013  |

OTHER PUBLICATIONS

Canadian Office Action issued in Application No. 2,852,568 dated Jun. 17, 2015.
Korean Office Action issued in Korean Application No. 10-2013-0106855, dated Feb. 2, 2015.
Korean Office Action issued in Korean Application No. 10-2013-0106855 dated Aug. 12, 2015.

* cited by examiner

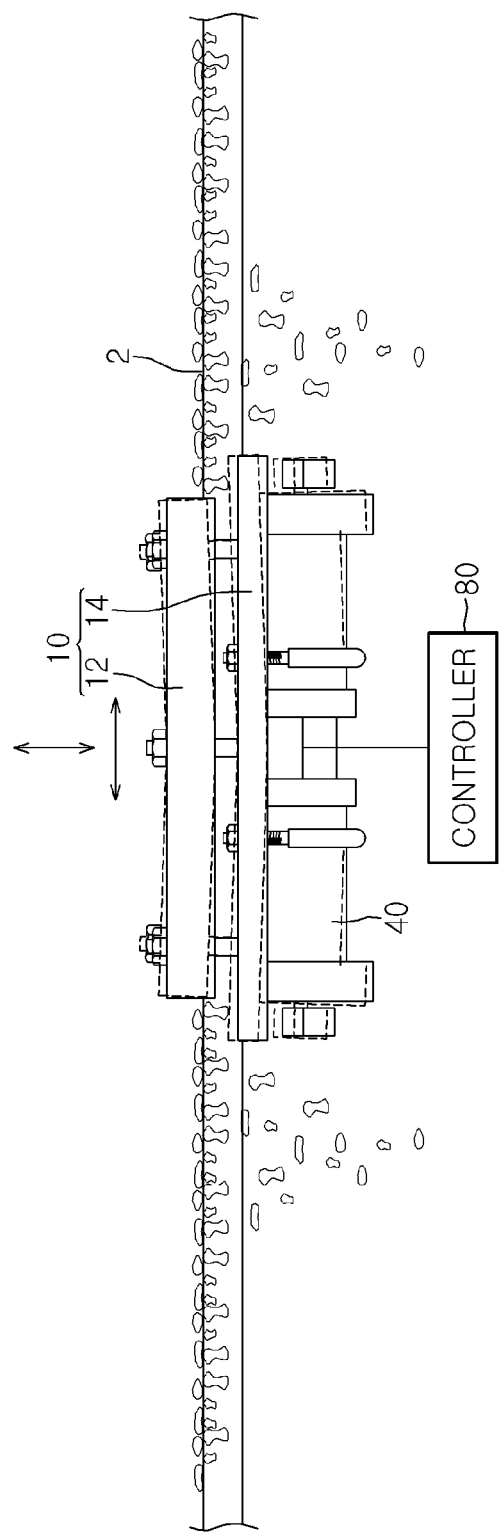

DEVICE FOR REMOVING ICE AND SNOW FROM POWER TRANSMISSION LINE

CROSS-REFERENCE TO RELATED APPLICATION

This application claims priority to and the benefit of Korean Patent Application No. 2013-0106855, filed on Sep. 5, 2013, the disclosure of which is incorporated herein by reference in its entirety.

BACKGROUND

1. Field of the Invention

The present invention relates to a device for removing ice and snow from a power transmission line and, more particularly, to a device for removing ice and snow from a power transmission line, capable of preventing safety accidents caused by disconnection of the power transmission line and improving reliability of facility operation because the ice and snow attached to the power transmission line are removed by applying vibrations to the power transmission line.

2. Discussion of Related Art

In general, power transmission lines supplying electric power produced at a generating station are supported on transmission towers with ice and snow attached thereto when it snows in the winter season.

Due to a heavy dead load, the power transmission lines are basically connected between the transmission towers in a sagging state. When the ice and snow are attached to the power transmission line, weight of the power transmission line is increased to cause a higher sagging degree. For this reason, a gust of wind or a heavy snowfall may cause a line contact, line disconnection, or a steel tower escape accident.

Further, due to a failure of a power transmission network system, system instability such as low-voltage abnormality may be still in existence. In the case of putting manpower to remove the ice and snow attached to the power transmission lines, an increase in maintenance cost and safety accidents may take place. When the power transmission line is disconnected, a replacement cost is increased. Thus, there is a need to improve this problem.

As the related art of the present invention, Korean Registered Utility Model No. 0259346 (titled "Foreign material cleaner of power transmission line" and granted on Dec. 18, 2001) is represented.

SUMMARY OF THE INVENTION

The present invention is directed to providing a device for removing ice and snow from a power transmission line, capable of preventing safety accidents caused by disconnection of the power transmission line and improving reliability of facility operation because the ice and snow attached to the power transmission line are removed by applying vibrations to the power transmission line.

Further, the present invention is directed to providing a device for removing ice and snow from a power transmission line, capable of installing an eccentrically rotatable eccentric part on a driver and providing efficient vibrations.

In addition, the present invention is directed to providing a device for removing ice and snow from a power transmission line, capable of installing a vibrator at a lower side of the power transmission line and securing stable mounting.

According to an aspect of the present invention, there is provided a device for removing ice and snow from a power transmission line, which includes a support member installed on the power transmission line, and a vibrator that is provided for the support member and applies vibrations to the power transmission line so as to remove the ice and the snow attached to the power transmission line.

Here, the support member may include a first support member covering one side of the power transmission line, and a second support member that is disposed to face the first support member and covers the other side of the power transmission line.

Further, the first support member and the second support member may be mutually fixed by a coupler.

Here, the coupler may include a close contact part that is formed on the first support member and encloses an upper surface of the power transmission line, a seat part that is formed on the second support member and supports a lower surface of the power transmission line, and fastening members, each of which is installed on edges of the first and second support members and fixes the first and second support members.

Further, the vibrator may include a driver disposed at a lower portion of the second support member, an installer installing the driver on the second support member, and an eccentric part that is coupled to a shaft of the driver and is eccentrically rotated to generate the vibrations.

Here, the installer may include a fixing bracket provided on one side of the driver, an installing bracket that is coupled to the fixing bracket and is installed at a lower side of the second support member, and fixing members that pass through the installing bracket and are coupled to the fixing bracket.

Further, the installing bracket may be inserted into and constrained in a constraint recess formed in a lower surface of the second support member.

Further, the eccentric part may include a fixing block connected to the shaft of the driver, and an eccentric block that is fixed to an outer circumferential surface of the fixing block and undergoes eccentric rotation.

Further, the driver may be fixed at the lower portion of the second support member by an auxiliary installer.

Here, the auxiliary installer may include a ring member which encloses the driver and both ends of which are inserted into the second support member, and fastening members that are fastened to the ends of the ring member and fix the ring member to the second support member.

In addition, the vibrator may have a pair of vibrators that are symmetrically formed in a pair in a lengthwise direction of the power transmission line on the basis of the center of the support member, and a controller may control an amount of vibration of the vibrators according to attached circumstances of the ice and the snow and may control the amount of vibration applied to the power transmission line.

The device for removing ice and snow from a power transmission line according to the present invention applies the vibrations to the power transmission line, and removes the ice and snow attached to the power transmission line. As such, it is possible to prevent safety accidents caused by disconnection of the power transmission line and to improve reliability of facility operation.

Further, the eccentrically rotatable eccentric part is installed on the driver. As such, it is possible to more efficiently provide the vibrations for the power transmission line.

In addition, since the vibrator is installed on the lower side of the power transmission line, the device for removing ice and snow from a power transmission line including the vibrator can be stably mounted on the power transmission line.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 6 shows how to use the device for removing ice and snow from a power transmission line according to the embodiment of the present invention.

DETAILED DESCRIPTION OF EXEMPLARY EMBODIMENTS

Figure 1:
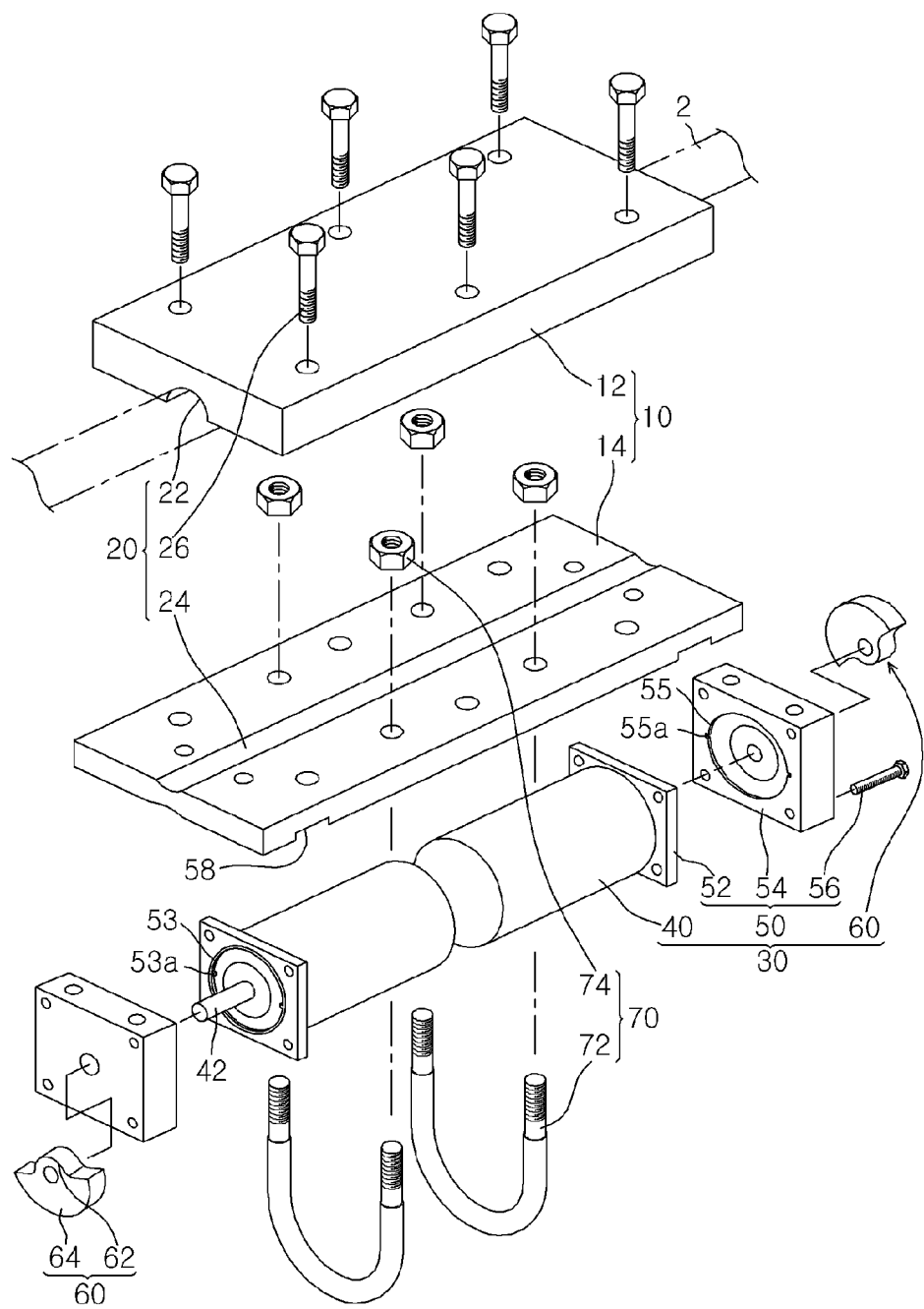
FIG. 1 is a disassembled perspective view showing a device for removing ice and snow from a power transmission line according to an embodiment of the present invention.

Hereinafter, a device for removing ice and snow from a power transmission line according to an embodiment of the present invention will be described with reference to the attached drawings.

In the drawings, the thickness or size of certain lines, layers, components, elements, or features may be exaggerated for clarity of description and for convenience. The technical terms, as will be mentioned hereinafter, are terms defined in consideration of their functions in the present invention, which may be varied according to the intention of a user or an operator, a practice, or the like, so that the terms should be defined based on the contents of this specification.

Figure 2:
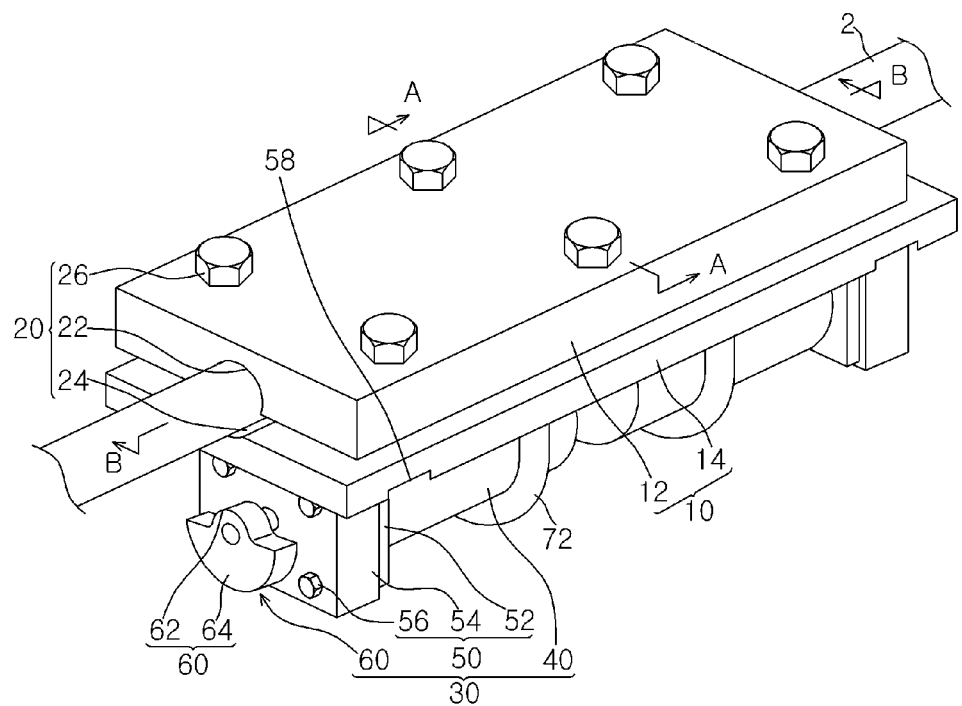
FIG. 2 is an assembled perspective view showing the device for removing ice and snow from a power transmission line according to the embodiment of the present invention.
Figure 3:
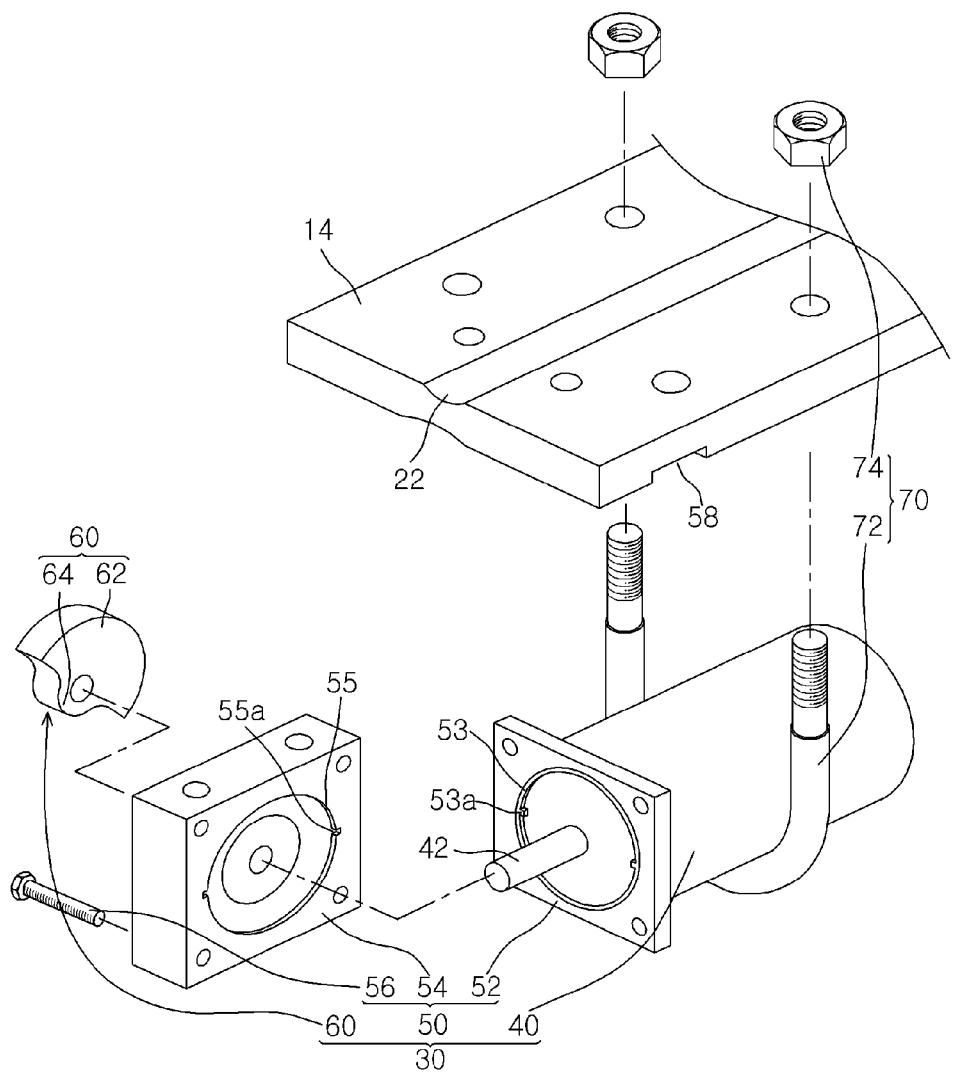
FIG. 3 is an enlarged perspective view showing major parts of a vibrator according to the embodiment of the present invention.
Figure 4:
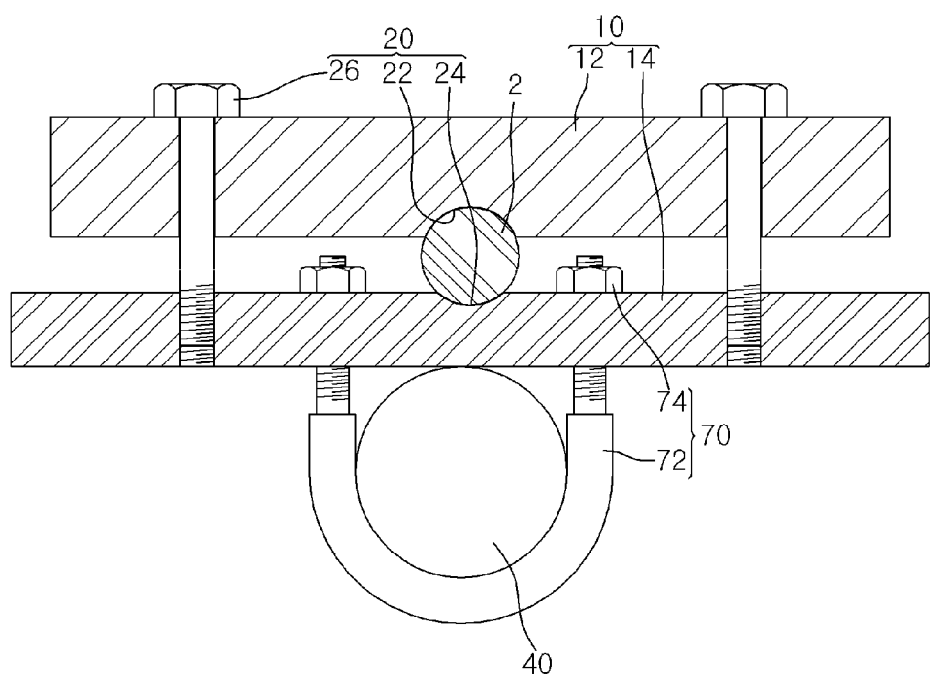
FIG. 4 is a cross-sectional view taken along line A-A of FIG. 2.
Figure 5:
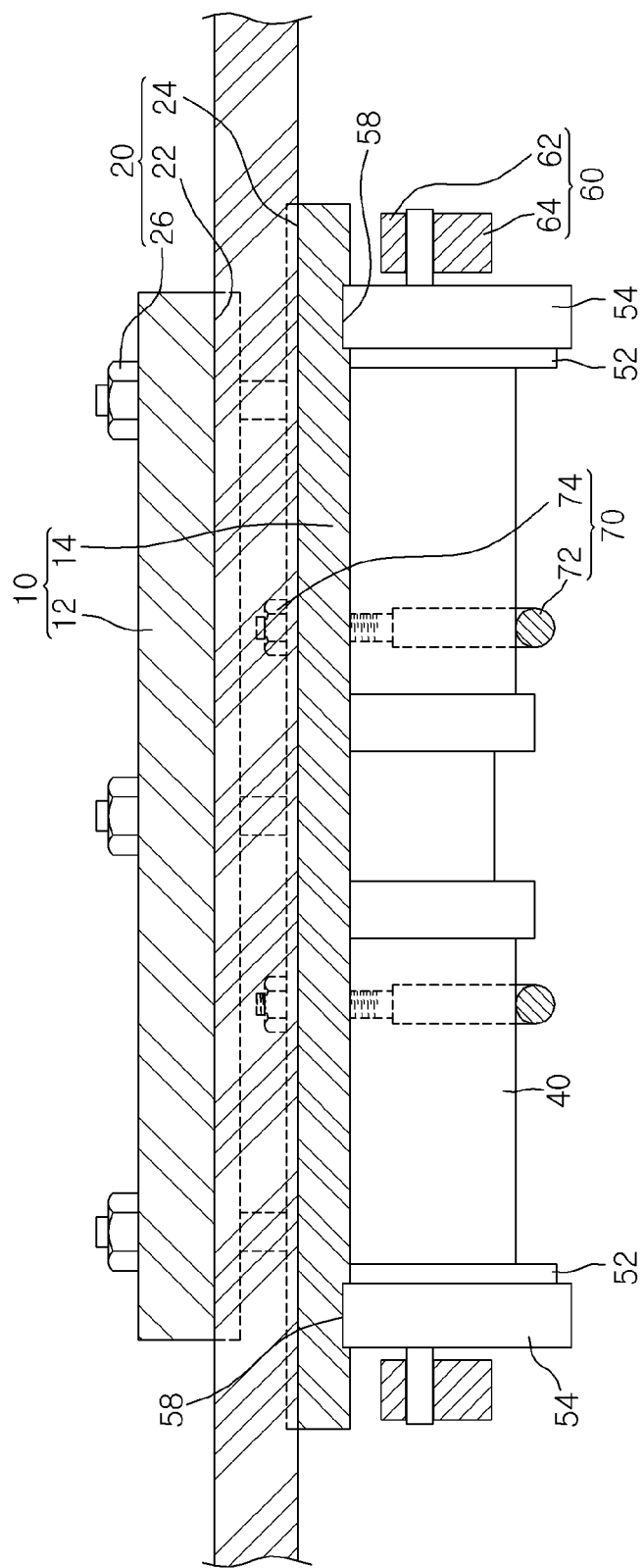
FIG. 5 is a cross-sectional view taken along line B-B of FIG. 2.

FIG. 1 is a disassembled perspective view showing a device for removing ice and snow from a power transmission line according to an embodiment of the present invention. FIG. 2 is an assembled perspective view showing the device for removing ice and snow from a power transmission line according to the embodiment of the present invention. FIG. 3 is an enlarged perspective view showing major parts of a vibrator according to the embodiment of the present invention. FIG. 4 is a cross-sectional view taken along line A-A of FIG. 2, and FIG. 5 is a cross-sectional view taken along line B-B of FIG. 2. FIG. 6 shows how to use the device for removing ice and snow from a power transmission line according to the embodiment of the present invention.

Referring to FIGS. 1 to 6, a device for removing ice and snow from a power transmission line according to an embodiment of the present invention includes a support member 10 and a vibrator 30.

The support member 10 is installed on a power transmission line 2 in various forms. The support member 10 may be configured in such a manner that two or more components, let alone a single component, are assembled to be installed on the power transmission line 2.

The support member 10 includes a first support member 12 covering one side of the power transmission line 2 and a second support member 14 that is disposed to face the first support member 12 and covers the other side of the power transmission line 2. For example, as in FIG. 1, the first support member 12 may be disposed on an upper side of the power transmission line 2 and cover an upper portion of the power transmission line 2, and the second support member 14 may be disposed on a lower side of the power transmission line 2 and cover a lower portion of the power transmission line 2. In addition, the first support member 12 and the second support member 14 may be variously changed in disposed position and size.

In the present embodiment, the first and second support members 12 and 14 have the shape of a quadrilateral plate having a predetermined thickness. Here, if it is possible to increase efficiency of removing the ice and snow attached to the power transmission line 2, the first and second support members 12 and 14 may be variously changed in thickness and shape.

The first and second support members 12 and 14 are mutually fixed by a coupler 20 with the power transmission line 2 interposed therebetween. The coupler 20 causes the first and second support members 12 and 14 to be stably coupled on the power transmission line 2 without mutual separation.

The coupler 20 includes a close contact part 22 that is formed on the first support member 12 and encloses an upper surface of the power transmission line 2, a seat part 24 that is formed on the second support member 14 and supports a lower surface of the power transmission line 2, and fastening members 26, each of which mutually connects edges of the first and second support members 12 and 14.

The close contact part 22 has the shape of a groove recessed in a lower surface of the first support member 12 so as to partly cover the upper surface of the power transmission line 2 to prevent the power transmission line 2 from being separated from the first support member 12. For example, the close contact part 22 may be a semi-circular groove covering about half an outer diameter of the power transmission line 2.

The seat part 24 has the shape of a groove recessed in an upper surface of the second support member 14 so as to partly cover the lower surface of the power transmission line 2 to prevent the power transmission line 2 from being separated from the second support member 14. For example, the seat part 24 may be a semi-circular groove covering the remaining portion of the outer diameter of the power transmission line 2.

The fastening members 26 are installed by passing through the edges of the first support member 12 so as not to overlap with the close contact part 22. Likewise, the fastening members 26 are installed by passing through the edges of the second support member 14 so as not to overlap with the seat part 24. To be specific, the fastening members 26 are inserted into inserting holes that vertically pass through both edges of the first support member 12, and are fastened to coupling holes formed in both edges of the second support member 14, thereby firmly coupling the first and second support members 12 and 14. For example, the fastening members 26 may be bolts.

Referring to FIGS. 1 and 3, the vibrator 30 is installed on the support member 10, and applies vibrations to the power transmission line 2, thereby removing the ice and snow attached to the power transmission line 2.

The vibrator 30 provides various vibrations, such as upward/downward vibration, leftward/rightward vibration, or forward/backward vibration, for the power transmission line 2 and removes the ice and snow attached to the power transmission line 2 in the winter season. In other words, the ice and snow attached to the power transmission line 2 are separated from the power transmission line 2 by the vibrations of the power transmission line 2 caused by the vibrator 30.

The vibrator 30 includes a driver 40 disposed on a lower surface of the second support member 14, an installer 50 installing the driver 40 on the second support member 14, and an eccentric part 60 that is coupled to a shaft 42 of the driver 40 and is eccentrically rotated to generate the vibrations.

The driver 40 may employ a motor. Of course, various driving devices may be applied as needed.

The installer 50 includes a fixing bracket 52 provided on one side of the driver 40, an installing bracket 54 that is coupled to the fixing bracket 52 and is installed at a lower side of the second support member 14, and fixing members 56 that pass through the installing bracket 54 and are coupled to the fixing bracket 52.

The fixing bracket 52 is shown in the form of a quadrilateral plate having a preset thickness, but it may employ various forms such as a circular plate. The installing bracket 54 is also shown in the form of a quadrilateral plate having a preset thickness, but it may be naturally modified in another form.

The fixing members 56 may employ bolts by way of example.

The fixing bracket 52 is provided with a first engagement part 53 in a front surface thereof, and the installing bracket 54 is provided with a second engagement part 55 in a rear surface thereof so as to be coupled to the first engagement part 53 in a corresponding way. As the first engagement part 53 is engaged with the second engagement part 55, it is possible to prevent relative movement from being generated between the fixing bracket 52 and the installing bracket 54.

The first engagement part 53 may have the shape of a circular protrusion protruding to a front surface of the fixing bracket 52 or a circular recess recessed in the front surface of the fixing bracket 52. If the first engagement part 53 has the shape of the circular protrusion, the second engagement part 55 has the shape of a circular recess recessed in a rear surface of the installing bracket 54. If the first engagement part 53 has the shape of the circular recess, the second engagement part 55 has the shape of a circular protrusion protruding to the rear surface of the installing bracket 54. As the first engagement part 53 and the second engagement part 55 are formed in the circular shape such as the circular protrusion or the circular recess, it is possible to prevent the upward/downward movement as well as the leftward/rightward movement.

In addition to the upward/downward and leftward/rightward movements, rotation between the first engagement part 53 and the second engagement part 55 is prevented by anti-rotation parts 53a and 55a. The anti-rotation parts 53a and 55a correspond to a first anti-rotation part 53a and a second anti-rotation part 55a.

The first anti-rotation part 53a is formed on the front surface of the fixing bracket 52, and the second anti-rotation part 55a is formed on the rear surface of the installing bracket 54 so as to be coupled to the first anti-rotation part 53a in a corresponding way.

The first anti-rotation part 53a may be a polygonal protrusion including at least one tetragonal protrusion protruding to the front surface of the fixing bracket 52, and the second anti-rotation part 55a may be a polygonal recess including a tetragonal recess recessed in the rear surface of the installing bracket 54.

The installing bracket 54 is inserted into and constrained in a constraint recess 58 formed in the lower surface of the second support member 14. The constraint recess 58 prevents the installing bracket 54 from moving on the lower surface of the second support member 14 in a forward/backward direction when the installing bracket 54 is fixed to the fixing bracket 52 by the fixing members 56.

The eccentric part 60 includes a fixing block 62 connected to the shaft 42 of the driver 40 and an eccentric block 64 that is connected to an outer circumferential surface of the fixing block 62 and undergoes eccentric rotation.

The fixing block 62 is formed in a disc shape and is coupled to the shaft 42 of the driver 40. The eccentric block 64 may be formed in a semicircular or sector shape having a greater radius than the fixing block 62. Further, the radius of the eccentric block 64 may be non-uniformly formed in whole or in part.

When the shaft 42 of the driver 40 is rotated, the eccentric part 60 connected to the shaft 42 is also rotated. Here, when the fixing block 62 of the eccentric part 60 is directed to the second support member 14, the fixing block 62 and the second support member 14 are not in contact with each other because the radius of the fixing block 62 is small. When the eccentric block 64 of the eccentric part 60 is directed to the second support member 14, the eccentric block 64 and the second support member 14 are in contact with each other because the radius of the eccentric block 64 is great.

In this way, during the rotation of the eccentric part 60, the contact and non-contact between the eccentric part 60 and the second support member 14 are continuously repeated due to a difference between the radii of the fixing block 62 and the eccentric block 64. In other words, since the radius of the eccentric part 60 is not uniform, the contact and non-contact between the eccentric part 60 and the second support member 14 occur repetitively. The repetition of the contact and non-contact between the eccentric part 60 and the second support member 14 vibrates the support member 10 including the second support member 14. In other words, the vibrations are generated at the support member 10 by the rotation of the eccentric part 60, and the power transmission line 2 enclosed by the support member 10 also vibrates due to the effect of the vibrations. Thus, the ice and snow attached to the power transmission line 2 can be separated and removed from the power transmission line 2.

The driver 40 is additionally fixed at the lower portion of the second support member 14 by an auxiliary installer 70. The auxiliary installer 70 includes a ring member 72 which encloses the driver 40 and both ends of which are inserted into the second support member 14, and fastening members 74 that are fastened to the ends of the ring member 72 and fix the ring member 72 to the second support member 14. For example, the ring member 72 may be a U-shaped ring, and the fastening members 74 may be nuts.

A pair of vibrators 30 are symmetrically formed in a lengthwise direction of the power transmission line 2 on the basis of the center of the installer 50.

Referring to FIG. 6, the vibrators 30 have an amount of vibration that is controlled by a controller 80. In other words, the controller 80 controls the amount of vibration of the vibrators 30. Thereby, the amount of vibration applied to the power transmission line 2 can be controlled according to attached circumstances of the ice and the snow.

The controller 80 controls a rotational direction, a rotational speed, etc. of the driver 40, thereby controlling the amount of vibration applied to the power transmission line 2. In detail, the controller 80 controls the two drivers 40 to be rotated in the same direction or in opposite directions, or at different speeds, thereby promoting more effective removal of the ice and snow attached to the power transmission line 2.

In this way, the device for removing ice and snow from a power transmission line according to the present invention applies the vibrations to the power transmission line 2, and removes the ice and snow attached to the power transmission line 2. As such, it is possible to prevent safety accidents caused by disconnection of the power transmission line, to improve reliability of facility operation, and to cut a replacement cost of the power transmission line 2 which is caused by the disconnection of the power transmission line.

Further, the eccentrically rotatable eccentric part 60 is installed on the driver 40 provided for the power transmission line 2. Thereby, it is possible to more efficiently provide the vibrations for the power transmission line 2.

In addition, since the vibrator 30 is installed on the lower side of the power transmission line 2, the device for removing ice and snow from a power transmission line including the vibrator 30 can be stably mounted on the power transmission line 2.

While the present invention has been described with reference to the embodiment shown in the drawings, the embodiment is merely illustrative and it will be understood by those skilled in the art that various modifications and other equivalent embodiments are possible.

Thus, the genuine technical scope of the present invention should be defined from the accompanying claims.

What is claimed is:

1. A device for removing ice and snow from a power transmission line, comprising:
   a support member installed on the power transmission line; and
   a vibrator that is provided for the support member and applies vibrations to the power transmission line so as to remove the ice and the snow attached to the power transmission line,
   wherein:
   the vibrator has a pair of vibrators that are symmetrically formed in a pair in a lengthwise direction of the power transmission line on the basis of the center of the support member, and
   a controller controls an amount of vibration of the vibrators according to attached circumstances of the ice and the snow and controls the amount of vibration applied to the power transmission line,
   wherein the support member includes:
      a first support member covering one side of the power transmission line; and
      a second support member that is disposed to face the first support member and covers the other, side of the power transmission line,
   wherein the vibrator includes:
      a driver disposed at a lower portion of the second support member;
      an installer installing the driver on the second support member; and
      an eccentric part that is coupled to a shaft of the driver and is eccentrically rotated to generate the vibrations,
   wherein the installer includes:
      a fixing bracket provided on one side of the driver;
      an installing bracket that is coupled to the fixing bracket and is installed at a lower side of the second support member; and
      fixing members that pass through the installing bracket and are coupled to the fixing bracket,
   wherein the fixing bracket is provided with a first engagement part in a front surface thereof, and the installing bracket is provided with a second engagement part in a rear surface thereof so as to be coupled to the first engagement part,
   wherein the first engagement part has a shape of a circular protrusion protruding to the front surface of the fixing bracket or a circular recess recessed in the front surface of the fixing bracket, and
   wherein the fixing bracket is provided with a first anti-rotation part in a front surface thereof, the installing bracket is provided with a second anti-rotation art in a rear surface thereof so as to be coupled to the first anti-rotation part, and rotation between the first engagement part and the second engagement part is prevented by part and the second anti-rotation part.

2. The device of claim 1, wherein the first support member and the second support member are mutually fixed by a coupler.

3. The device of claim 2, wherein the coupler includes:
   a close contact part that is formed on the first support member and encloses an upper surface of the power transmission line;
   a seat part that is formed on the second support member and supports a lower surface of the power transmission line; and
   fastening members, each of which is installed on edges of the first and second support members and fixes the first and second support members.

4. The device of claim 1, wherein the installing bracket is inserted into and constrained in a constraint recess formed in a lower surface of the second support member.

5. The device of claim 1, wherein the eccentric part includes:
   a fixing block connected to the shaft of the driver; and
   an eccentric block that is fixed to an outer circumferential surface of the fixing block and undergoes eccentric rotation.

6. The device of claim 1, wherein the driver is fixed at the lower portion of the second support member by an auxiliary installer.

7. The device of claim 6, wherein the auxiliary installer includes:
   a ring member which encloses the driver and both ends of which are inserted into the second support member; and
   fastening members that are fastened to the ends of the ring member and fix the ring member to the second support member.

* * * * *